Patented June 27, 1944

2,352,261

UNITED STATES PATENT OFFICE 2,352,261

METHOD OF PREPARING DICARBOXYLIC ACID ESTERS

Gordon D. Hiatt and John Emerson, Rochester, N. Y., assignors to Eastman Kodak Company, Rochester, N. Y., a corporation of New Jersey No Drawing. Application September 17, 1941, Serial No. 411,198

6 Claims. (Cl. 260—225)

This invention relates to the acylation of cellulose derivatives containing free and acylatable functional groups, by dissolving them in molten dicarboxylic acid anhydrides.

Various methods have been proposed for the acylation of cellulose derivatives. For instance, in the acylation of cellulose esters with dicarboxylic acid anhydrides, previous methods have involved the use of other materials therewith, such as tertiary amines or lower ketones and water. In those processes in which organic bases were employed, the product has been a salt of the base and it has been necessary to acidify the mass to obtain the acid form of the product. In those processes in which lower ketones and water have been employed it has been necessary to remove those liquids to obtain the final product.

One object of our invention is to provide a method of acylating cellulose esters and ethers having free and esterifiable hydroxyl groups, with dicarboxylic acid anhydrides in which no other materials are necessary except the compound and the anhydride. Other objects of our invention will appear herein. We have found that compounds of the type referred to above may be readily acylated by dicarboxylic acid anhydrides with those compounds in dry form or mixed with the dicarboxylic acid anhydrides with the application of heat so that the acid anhydride is melted and the compound dissolves therein to form a uniform thick solution. We have found that the resulting products are soluble in dilute alkaline solutions, thus showing the presence of dicarboxylic acid groups.

The temperatures employed in an acylation reaction, in accordance with our invention, are governed by the melting points of the particular anhydrides used. For instance, maleic anhydride has a low melting point and, consequently, the reaction, using maleic anhydride takes place very readily at 70–100° C. Succinic anhydride, which melts at 120° C., and phthalic anhydride, which melts at 128° C., require temperatures of at least their melting points to promote the reaction. At the higher temperatures the reactions may be completed in one or two hours, whereas, with previous reactions of this type, six to ten hours or even longer have been necessary. Because of the saving in time with the use of higher temperatures, the acylation process is ordinarily carried out at temperatures within the range of 140–180° C., although where longer reaction times are not objectionable, lower temperatures may be employed.

Compounds useful for the starting material in our process are the cellulose esters and ethers containing free and esterifiable hydroxyl groups. The cellulose esters of this type are ordinarily obtained by hydrolyzing fully esterified cellulose. For example, an acetone-soluble cellulose acetate or a hydrolyzed mixed fatty acid ester of cellulose would be suitable. The cellulose ethers of this type are ordinarily obtained by not completely etherifying the cellulose. For instance, cellulose ethers within the range of 42–49% ethoxyl content come within this classification. The cellulose ethers, which are commercially available, usually have an ethoxyl content within this range and, therefore, are suitable for acylation in accordance with our process. Not only ethyl cellulose but other cellulose ethers, such as methyl cellulose, benzyl cellulose, or the like, may be employed, as the presence of the grouping attached to the cellulose does not interfere with the reaction. The vegetable gums, such as gum arabic, gum tragacanth and agar, may be employed in this process.

Of the cellulose esters which may be employed as the starting material, it is preferred to employ a lower fatty acid ester of cellulose, such as of the fatty acids of 2—4 carbon atoms. For instance, such esters may be prepared by esterifying cellulose, hydrolyzing the cellulose ester formed and precipitating in the form of a fibrous mass. To get a substantial addition of dicarboxylic acid radicals, it is preferred that the acyl content of the lower fatty acid ester of cellulose be somewhat lower than that of the fully esterified esters. As the content of dicarboxylic acid groups, which may be added, is ordinarily governed in the case of the cellulose esters by the hydroxyl content of the starting material; with a cellulose acetate, it is preferable that the ester employed as the starting material have an acetyl content of no more than 40%. The cellulose ethers generally employed for starting materials are the lower alkyl ethers of cellulose.

In cases where a cellulose compound is used as the starting material, it is desirable, after the reaction has occurred, to mix the mass with a small amount of solvent to dissolve the product and the product may then be precipitated in water to separate it from any unreacted anhydride which may be present. Instead of water, some other precipitating liquid, such as aqueous alcohol, may be used to throw the cellulose ester out of solution.

The following examples illustrate the acylation of cellulose esters with dicarboxylic acid anhydrides:

Example I

Equal parts of succinic anhydride and cellulose acetate, having an acetyl content of 32%, were mixed and heated together at a temperature within the range of 150°–175° C. for ¾ of an hour. The mass was diluted with methyl cellosolve and the acylated cellulose was recovered by precipitating in water. The ester was found to be soluble in dilute sodium bicarbonate. After a thorough washing, the product was analyzed and found to have a succinyl content of 18.5%.

Example II

Equal parts of phthalic anhydride and cellulose acetate, having a 32% acetyl content, were mixed and heated for one hour at 180° C. The product was diluted and precipitated in water. The resulting cellulose acetate phthalate contains 21.8% of combined phthalyl.

Example III

Two parts of maleic anhydride and 1 part of cellulose acetate, containing 32% of acetyl, were mixed and heated for 22 hours on a steam bath. The resulting mass was diluted, precipitated in a large volume of water and recovered as a white granular solid. The product was found to contain 19.9% maleyl and to be soluble in aqueous sodium bicarbonate.

The following example illustrates the reaction upon a cellulose ether in accordance with this invention:

Example IV 1 part of ethyl cellulose, having an ethoxy content of 49.4%, was thoroughly mixed with 1.5 parts of maleic anhydride. The mass was heated for 4 hours at 150° C., thereby obtaining a thin solution. The resulting product was found to have a maleyl content of 21.3% and to be soluble in methyl alcohol and dilute aqueous sodium bicarbonate.

As this invention depends upon dissolving of the cellulose derivative in the dicarboxylic acid anhydride, it is desirable that the anhydride be present in an amount equal to or greater than the polymer as with substantially lesser amounts of anhydride a viscous mass is obtained and the reaction does not proceed as smoothly as when at least 1 part of anhydride is employed for every part of the polymer.

The products of this invention, because of their solubility in aqueous basic solutions, are suitable for use in any instance where solubility in dilute alkali is of particular importance.

We claim:

1. A method of preparing dicarboxylic acid esters of cellulose derivatives which comprises heating a mixture essentially consisting of a dicarboxylic acid anhydride having a melting point of less than 180° C. and a compound selected from the group consisting of the cellulose esters and the cellulose ethers, each having free and esterifiable hydroxyl groups to a temperature between the melting temperature of the anhydride and 180° C.

2. A method of preparing dicarboxylic acid esters of cellulose derivatives which comprises heating a mixture essentially consisting of a dicarboxylic acid anhydride having a melting point of less than 180° C. and a cellulose ester having free and esterifiable hydroxyl groups to a temperature between the melting temperature of the anhydride and 180° C.

3. A method of preparing a dicarboxylic acid ester of cellulose acetate which comprises heating a mixture essentially consisting of a dicarboxylic acid anhydride having a melting point of less than 180° C. and cellulose acetate containing free and esterifiable hydroxyl groups to a temperature between the melting temperature of the anhydride and 180° C.

4. A method of preparing phthalic acid esters of cellulose derivatives which comprises heating a mixture essentially consisting of phthalic anhydride and a compound selected from the group consisting of the cellulose esters and the cellulose ethers, each having free and esterifiable hydroxyl groups to a temperature between the melting temperature of the anhydride and 180° C.

5. A method of preparing cellulose acetate phthalate which comprises heating a mixture essentially consisting of phthalic anhydride and a cellulose acetate containing free and esterifiable hydroxyl groups to a temperature between the melting temperature of the anhydride and 180° C.

6. A method of preparing dicarboxylic acid esters of cellulose ethers which comprises heating a mixture essentially consisting of a dicarboxylic acid anhydride having a melting point of less than 180° C. and a cellulose ether having free and esterifiable hydroxyl groups to a temperature between the melting temperature of the anhydride and 180° C.

GORDON D. HIATT.
JOHN EMERSON.